H. W. ROBERTS AND J. H. OVERTON.
APPARATUS FOR FORMING HOLLOW RUBBER GOODS.
APPLICATION FILED OCT. 8, 1921.

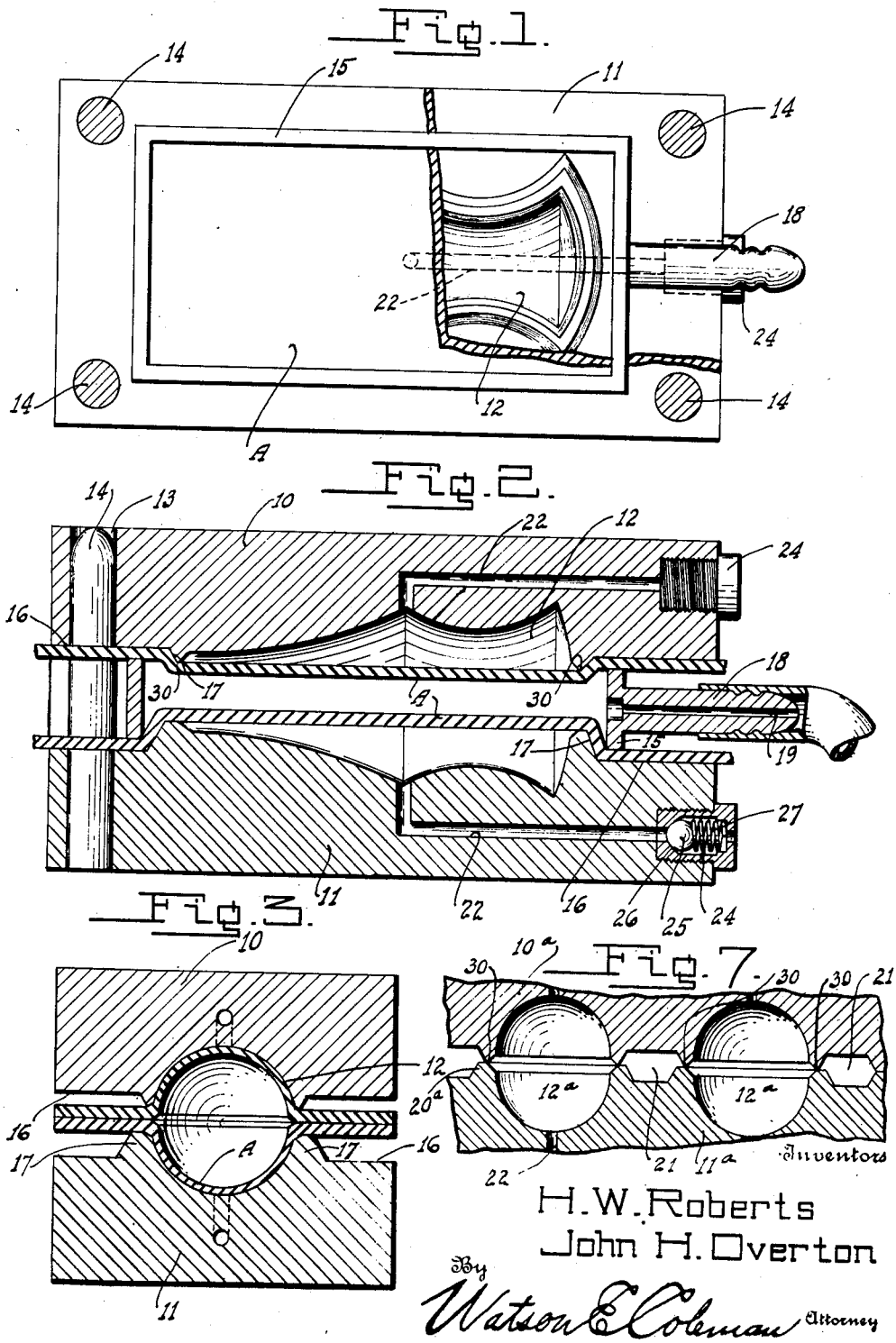

1,404,320.

Patented Jan. 24, 1922.

Inventors
H. W. Roberts
John H. Overton
By Watson E. Coleman, Attorney

UNITED STATES PATENT OFFICE.

HARRY W. ROBERTS AND JOHN H. OVERTON, OF TRENTON, NEW JERSEY.

APPARATUS FOR FORMING HOLLOW RUBBER GOODS.

1,404,320. Specification of Letters Patent. Patented Jan. 24, 1922.

Application filed October 8, 1921. Serial No. 506,252.

*To all whom it may concern:*

Be it known that we, HARRY W. ROBERTS and JOHN H. OVERTON, citizens of the United States, residing at Trenton, in the county of Mercer and State of New Jersey, have invented certain new and useful Improvements in Apparatus for Forming Hollow Rubber Goods, of which the following is a specification, reference being had to the accompanying drawings.

This invention relates to the formation of hollow articles of plastic sheet material, particularly rubber, and particularly to apparatus of this kind wherein sheet rubber is disposed between concave dies and forced outward to engage the dies by air pressure.

The general object of this invention is to provide a construction of this character in which the crude rubber sheets are disposed against the confronting faces of two dies, between which rubber sheets a skeletonic frame is disposed which comes in contact with the sheet rubber only around the outer edge of the sheet, this frame being provided with means whereby air may be admitted to the interior of the frame and thus to the space between the rubber, whereby the rubber sheets may be forced outward and into the die concavities.

A further object in this connection is to eliminate the use of soapstone on the confronting surfaces of the sheet rubber to prevent the sheet rubber from sticking to the upper and lower surfaces of the usual platen used and eliminate the necessity of cleaning the rubber sheets with benzine or benzol in order to remove the talc or soapstone usually used.

A still further object is to provide a construction of this kind which will expedite production and very greatly decrease the number of defective articles produced.

Another object is to provide a construction of this character wherein multiple dies are used, these dies being so formed as to provide a plurality of concavities, and to provide means permitting the outlet of air from each die concavity when the rubber is pressed thereinto, this means including a valve permitting the discharge of air but preventing the return of air.

Our invention is illustrated in the accompanying drawings, wherein:—

Figure 1 is a top plan view of the lower die of our apparatus, the sheet rubber being partly broken away;

Figure 2 is a vertical sectional view of the upper and lower dies and of the sheet rubber and frame 15;

Figure 3 is a transverse sectional view of the construction shown in Figures 1 and 2 but showing the frame removed;

Figure 7 is an enlarged sectional view of the top and bottom dies, clearly showing the cutting edges and the overflow groove.

Figure 4:
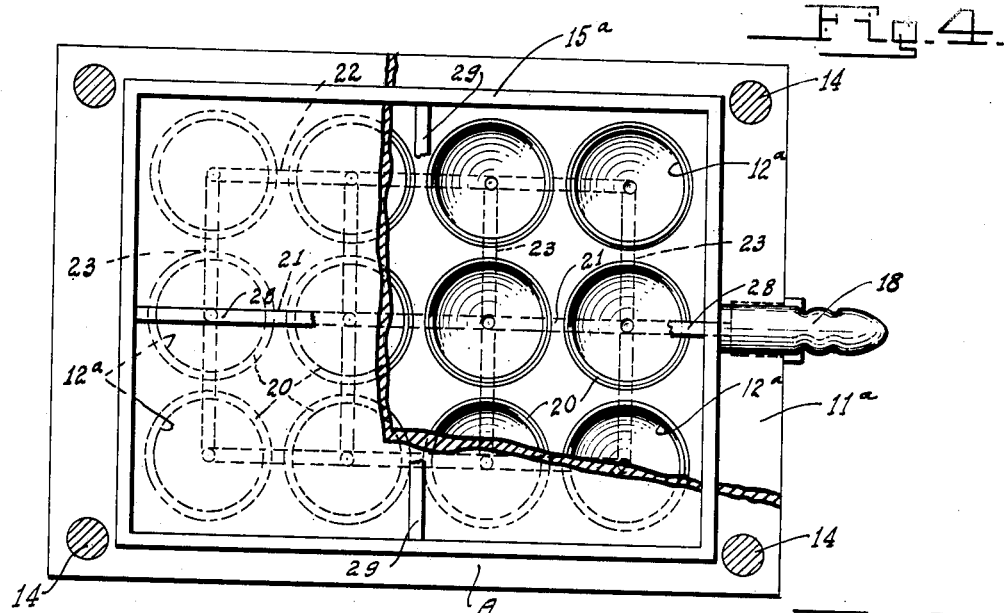
Figure 4 is a top plan view of the lower die with a modified form of our mechanism, the rubber being partly broken away.

Referring to these drawings, it will be seen that in Figures 1 and 2, we show a die which is used for the production of articles from bladders or biscuits of crude rubber. The mechanism comprises an upper die 10 and a lower die 11, both of these dies being formed with corresponding cavities 12. These cavities correspond in contour. The corners of the dies are provided with registering apertures 13 for the introduction of dowel pins 14 whereby the dies may be held together or in alignment.

In the operation of forming a hollow sheet rubber article with this apparatus, we dispose a sheet of rubber A across the face of the lower die. Then a steel frame 15 is disposed upon the face of the rubber or the lower die. Then a second sheet of rubber A is disposed upon the upper edge of the steel frame. Then the top die 10 is disposed upon the sheet rubber. It will be noted that exteriorly of the cavity 12 each die is depressed, as at 16, so as to leave a wall 17 between the cavity and this depressed portion 16. The frame 15 is shown as rectangular in plan and entirely surrounds the cavities 12 of both dies exteriorly of the wall 17 so that this frame presses the sheet rubber against the faces 16. This frame is relatively thin in cross section so that it has very little surface in contact with the rubber. The frame is formed at one point with the outwardly projecting nipple 18 having a centrally disposed duct 19 which opens into the interior of the frame. This nipple is adapted to be connected by rubber or flexible pipe to any suitable source of compressed air.

With the parts in the position shown in Figure 2, it will be obvious that when air under pressure is forced into the air chamber 19 defined by the frame 15 and the sheets A of rubber, the air pressure will force the crude sheet rubber outward and into the cavities 12 and force it to conform to the shape of these cavities. When the crude rubber has been forced out into the cavities, then the top die is removed from the air chamber 15, the air chamber is removed, and then the two dies are placed together, as in Figure 3, and pressure is used to force the dies toward each other in a suitable press and this completes the operation of uniting the two half sections of rubber so as to form a hollow body. The walls 17 may be used as cutters so that when the half sections are forced together these walls will cut the material so as to leave a hollow body formed in two sections firmly joined to each other.

Figure 5:
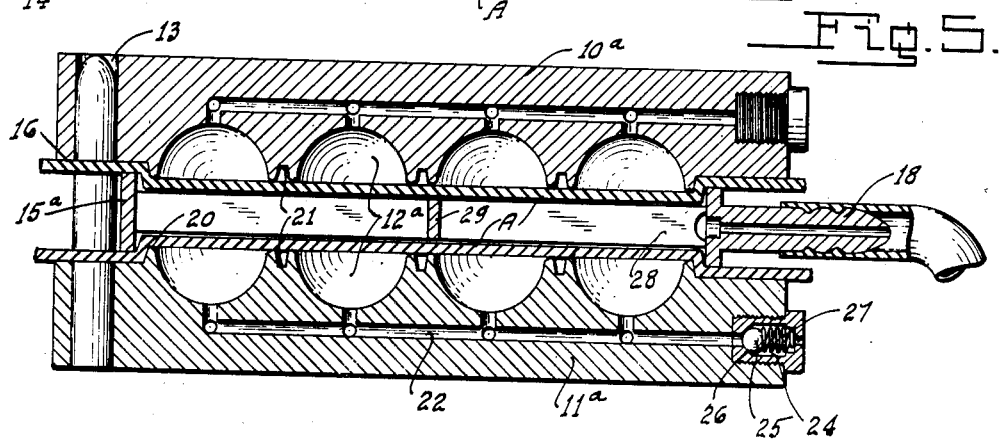
Figure 5 is a longitudinal vertical sectional view therethrough.

In Figures 4 and 5, we show a slightly different form of the invention, in which the two dies 10ª and 11ª are formed with a plurality of cavities 12ª, these cavities being illustrated as semi-spherical.

Figure 6:
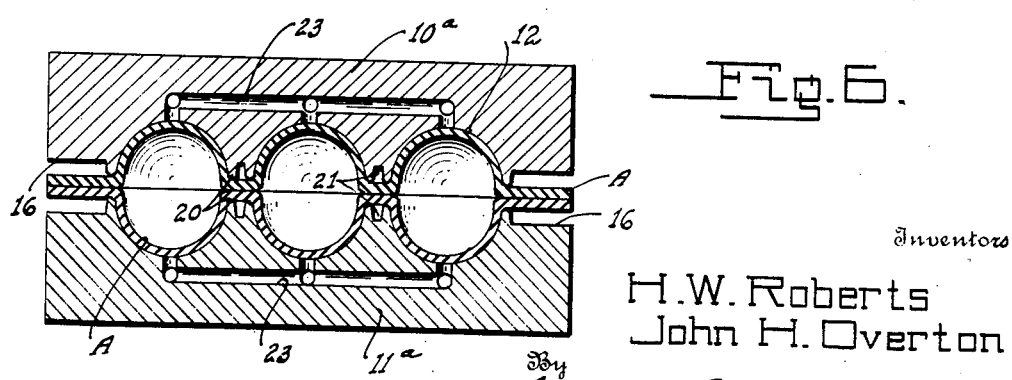
Figure 6 is a transverse vertical sectional view showing the frame 15$^a$ removed and the dies pressed together.

It will be seen from Figures 5 and 6 that each of these cavities is defined by an outstanding wall 20 and that the space 21 between these outstanding walls when the dies are together, as illustrated in Figure 7, constitutes an overflow cavity for the rubber. Each outstanding wall is formed, as illustrated in Figure 7, with a cutting edge 30 whereby the rubber blanks are cut apart outward of their juncture.

Each die is preferably formed with a series of ducts 22 extending beneath a plurality of the recesses 12ª, these ducts being connected to each other by cross ducts 23 and one of the main ducts 22, as for instance the middle one, opens into a valve chamber 24 wherein is a ball check valve 25 urged to its seat 26 by a spring 27. This ball check valve will open to permit the discharge of air from the cavities 12ª but will close against any inlet of air.

Preferably in the larger molds for forming dies the frame 15ª will be formed with a longitudinal, medially disposed member 28 and a transverse frame member 29, these frame members 28 and 29 being less in depth than the depth of the main frame 15ª, the purpose of these cross strips 28 and 29 being to support the sheets of rubber and prevent their coming in contact with each other. Of course, on small dies there is no necessity for these longitudinal and transverse cross pieces.

It will be seen that this construction provides a multiple top and bottom die having cavities of any desired shape, the cavities being provided with cutting edges and depressions surrounding the cutting edge of the die to admit surplus rubber after the cutting operation. A skeleton frame or air chamber 15ª extends around the entire area of the die body and rests only upon the outer margin of the die body. In use, the sheets of rubber A are disposed exactly as illustrated in Figure 5 between each die body and this frame. Then the die body is closed against the frame 15ª, air is admitted and the rubber is blown out into the cavities 12ª, thus blowing the rubber out into the cavities and giving it the preliminary form. Then, as before described, the frame 15ª is removed and the two sheets of rubber are brought together and the die bodies are pressed against each other, thus joining the two semi-spherical sections of the article and cutting these sections out of the sheet rubber itself. The channels 22 and 23 with the check valve 25 permit the escape of air from between the rubber and the faces of the cavities but does not permit the return of the air.

It will be seen that the cutting edges 30 of the top die are so formed in conjunction with the coacting edges of the lower die that they press the two sheets of stock together before the cutting away of the waste or surplus, thereby making a tight seam. The inner facets of the cutting edges 31 are beveled so that the circumferential edge of the conjoined blanks are beveled neatly. This is more clearly shown in Figure 7, which shows the top die and the bottom die brought together.

One of the advantages of this construction is that the frame 15 or 15ª is so narrow that there is no danger of the frame sticking to the sheet rubber even though talc powder or soapstone is not used. Soapstone or talc is very detrimental to the seam or union of the rubber sections and the use of this material is entirely eliminated with our construction. Where soapstone or talc is used, it is necessary to clean the rubber sheets with benzine or benzol in order to remove the talc before bringing the rubber sheets into contact with each other to form the completed article. This use of benzol is very detrimental to the seam or union between the two sections unless ample time be given to permit the benzol to evaporate before the dies are brought together. The necessity of giving this time, therefore, retards production and the use of talc and soapstone with benzine or benzol tends to increase the number of defective articles produced unless great care be exercised.

It is to be particularly noted that the crude rubber sheets in our construction form the casing whereby an air-tight chamber is provided and no other casing is necessary to be used. Attention is also called to the fact that not only do we blow the rubber into the cavities, but inasmuch as the air is forced out from behind this rubber and cannot return the rubber is caused to stick to the entire surface of the die body. This is of especial advantage for the top die as the sheet rubber should remain in position after forming the latter and when pressure is released to remove the air chamber and complete the pressing operation. It will be noted that air has free access to the whole surface of the rubber and not to mere limited portions of the rubber so that when the air is admitted the rubber is stretched evenly throughout its entire surface, thus forming a more uniform article or articles.

It is also to be noted that the skeleton frame surrounds a plurality of cavities and that this skeleton frame is entirely open upon its opposite faces, that is the top and bottom. This skeleton frame causes the air, when it is admitted, to stretch the rubber evenly throughout the entire extent of the rubber, thus forming a more uniform article. Where the rubber is held, between the cavities, this rubber which is clamped by the ordinary platen cannot stretch evenly and the only part of the rubber which stretches is that part which is immediately over a cavity.

In Figures 1 and 2 we illustrate the use in conjunction with the dies 10 and 11 of the air ducts 22 and the check valve 25 to permit the escape of air from the cavities 12 when the rubber is pressed outward by the air pressure between the sheets of rubber.

We claim :—

1. Mechanism for forming hollow articles of plastic material, including coacting dies having coacting cavities and against the confronting faces of which members sheet rubber is adapted to be disposed, and an entirely open frame having the general form of the dies but less in area than the area of the dies and adapted to be disposed between the dies, the wall of the frame being relatively thin and the frame being provided at one point with means whereby air may be injected into the space surrounded by said frame and between said sheets of rubber.

2. Mechanism for forming hollow rubber articles including opposed confronting dies having confronting cavities, the cavity in each die being defined by an outstanding wall, and a frame adapted to be disposed between the two dies and surrounding said wall, said frame being entirely open on both faces and having means whereby air may be forced into the space defined by said frame.

3. Mechanism for forming hollow articles of plastic material comprising opposed dies having confronting cavities, the dies being formed with cutting edges defining said cavities and overflow ducts surrounding the cutting edges of the die, and a skeletonic frame or air chamber adapted to extend over the entire area of the die body and resting only against the outer margin of the die bodies and being entirely open on its opposite faces, this frame being formed with means whereby air may be injected into the space within said frame.

4. Mechanism for forming hollow articles of plastic material comprising opposed dies having confronting cavities, the dies being formed with cutting edges and depressions surrounding the cutting edges of the die, and a skeletonic frame or air chamber adapted to extend over the entire area of the die body and resting against the outer margin of the die bodies, this frame being formed with means whereby air may be injected into the space within said frame, the dies having outlet air ducts communicating with the interior of the cavity, each duct being provided with a check valve preventing the inlet of air into the duct but permitting the outlet of air therefrom.

5. Mechanism for forming hollow articles from sheets of plastic material consisting of confronting dies, each die having a plurality of die cavities, the sheet rubber being adapted to be disposed against the confronting faces of the dies, each die having a series of communicating ducts communicating with each other and with the interior of the cavities, one of said ducts having an outlet provided with an outwardly opening check valve, and a skeletonic frame adapted to be disposed between the dies and between the sheet rubber applied thereto, the frame bearing at its edges only against the marginal portions of the two dies, said frame having an inlet whereby air may be forced into the space defined by said frame.

6. A mechanism for forming hollow rubber articles including opposed confronting dies each having a confronting cavity, the cavity in each die being defined by an outstanding wall, the space around said wall forming overflow ducts, the outstanding walls defining the cavities of one die being formed with a cutting edge, and a frame adapted to be disposed between the two dies and surrounding said wall, the frame being entirely open on its opposite faces and having means whereby air may be forced into the space defined by said frame.

In testimony whereof we hereunto affix our signatures.

HARRY W. ROBERTS.
JOHN H. OVERTON.